C. F. SINN & W. STUDER.
Car-Brake.
No. 222,317.　　　　　Patented Dec. 2, 1879.
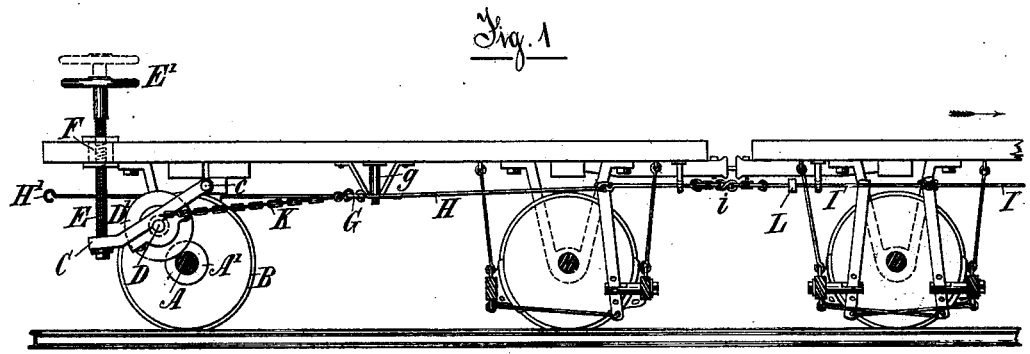
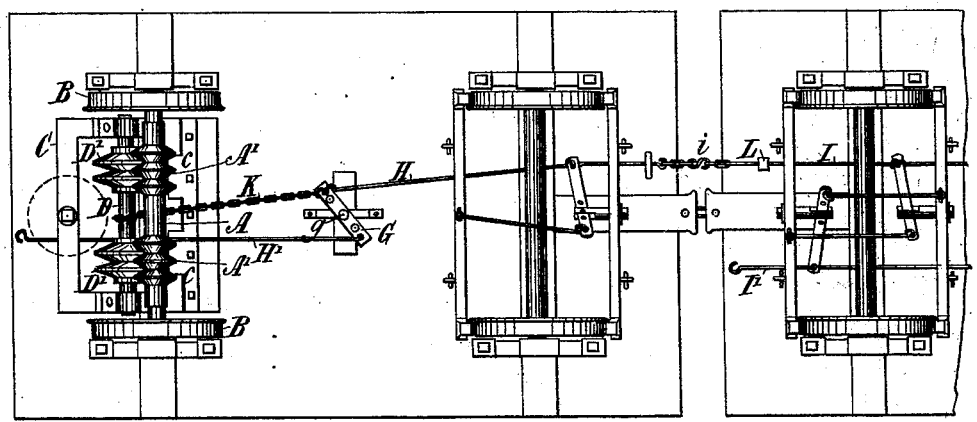

UNITED STATES PATENT OFFICE.

CARL F. SINN AND WILLIAM STUDER, OF MONTREAL, ASSIGNORS OF ONE-THIRD OF THEIR RIGHT TO PHILIP McRAE, OF WATERLOO, QUEBEC, CANADA.

IMPROVEMENT IN CAR-BRAKES.

Specification forming part of Letters Patent No. 222,317, dated December 2, 1879; application filed October 13, 1879.

*To all whom it may concern:*

Be it known that we, CARL FREDERICK SINN and WILLIAM STUDER, both of the city of Montreal, in the district of Montreal, and Province of Quebec, Canada, have invented certain new and useful Improvements in Railway-Brakes; and we do hereby declare that the following is a full, clear, and exact description of the same.

Our invention has reference to that class of brakes which are worked and governed by the driver, conductor, or any one of the train-hands, receive their motive force from the movement of the train, and operate to apply simultaneously all the brake-shoes to the wheels of the train, and, although applicable to all trains, will be found specially useful to those carrying freight.

It may be thus described: To the under side of the tender, van, or any one of the cars composing a train, is hung loosely a frame, having its free end raised, lowered, and held in any position desired by means of a vertical screw-rod passing through suitably-threaded bushings set in the floor of the car. In this hinged frame are formed bearings for a short shaft, having frictional surfaces formed on it, and arranged parallel to the axle of any one pair of the wheels, this being furnished with corresponding frictional surfaces, so that when the frame is lowered these several frictional surfaces are brought into contact, and the revolution of the axle rotates this short shaft, winding upon it a chain attached at one end thereto, and with the other end secured to one arm of a lever pivoted under the car, and connected with a series of rods placed one under each car, coupled together adjustably and operating when drawn upon to apply the brake-levers throughout the train. Provision may also be made so that if, by any accident, the car-couplings break, the connections of these continuous rods shall become detached at that point, so as to obviate the danger of the locomotive, in such a case, drawing out and wrecking the whole brake apparatus of the train.

For full comprehension, however, of the nature and operation of our invention, reference must be had to the annexed drawings, in which—

Figure 1 is a side view of our brake apparatus with the brakes put on, and showing its connection with the next car, and Fig. 2 is a plan view of same, looking up.

Similar letters of reference indicate like parts.

A is the axle of any one pair of the wheels B B, A' A' being frictional surfaces formed on said axle, preferably of some such section as that shown in Fig. 2.

C is a frame of any suitable size and shape, and, as shown, hinged at $c$, to the under side of the car, having formed in or on it bearings for the shaft D, which has formed upon it frictional surfaces D', of such a section that, when brought in contact with the frictional surfaces A', they will intermesh closely therewith.

Although the respective sections of these frictional surfaces (*i. e.*, lines at acute angles to each other) will be found very effective for the purpose for which they are designed, it must be understood that we do not confine ourselves to this particular shape, as any other suitable section may be used.

E is a screwed rod with thread of any pitch desired, provided with a handle or wheel, E', for turning it, and having its lower end secured to the free end of the frame A by a nut or in any other usual way. This rod E passes through and works in a bushing or bearing, F, formed in the floor of the car, and threaded to correspond with the screw.

G is a lever arranged, preferably, about the center of the car to which the apparatus is attached, and pivoted to a pin, $g$, suitably stayed, if desired. To the ends of this lever are connected rods H H', going, one in one direction and one in the other, the rod H being in this case connected by a hook or other adjustable coupling, $i$, to a similar rod, I, carried in eyes or loose bearings under the next car, similar rods being carried under each car of the train.

K is a chain or wire rope of any desired pattern and suitable strength, one end of which is attached to the shaft or rod D, and the other to one end of the lever G.

We need not allude to the brake-levers, beams, and shoes further than to say that they are of any ordinary construction, and so arranged relatively to each other and the several rods H I, &c., and corresponding rods H' I', to be presently described, that the traction of these rods will bring all the brake-shoes in contact with the wheel-tires. This traction is effected by lowering, by means of the screwed rod E, the free end of the frame C until the frictional surfaces D' come in contact with those marked A' on the axle A, when the revolution of this last will rotate the shaft D, and wind up on it the chain K, thus drawing toward it one end of the lever G, and pulling on the whole of the continuous rods with the effect mentioned.

One special point in connection with this device must be mentioned—viz., that the strain can only be put on to a certain point, when the frictional surfaces A' will slip, thus allowing the axle A to revolve freely, while at the same time the shaft D, with the chain wound up on it, is firmly held in position. By reversing the movement of the screw E and raising the free end of the frame C, thus removing the frictional surfaces A' and D' from contact with each other, the brakes are thrown off.

The lever G will be made of sufficient throw to take up the slack of the couplings of several of the cars, and should the train be a very long one, as the brake apparatus is, by preference, placed under the van, the locomotive, in drawing against the resistance of the braked cars, will put on all the brakes.

In order to allow of the cars being braked from either end, rods corresponding and in addition to the rods I, &c., as shown at I', are provided under each car. These, connecting with the rod H', are worked, as just described, by the lever G, which operates equally well in either direction.

Should it be thought necessary, shoulders, as at L, may be cast on the respective rods, so that should the coupling of any of the cars break, and any of the cars become detached, these will come against the bearings, and, by holding the tension-rods from extra movement, will cause the couplings of these rods to give way at the point of detachment, thus preventing the locomotive from pulling out by its draft the whole of the brake apparatus.

We are aware that continuous rods made up in sections, and in connection with levers, have been used to operate simultaneously all the brakes of a train; but in this case the levers, one to each car, received their motion from the continuous rods, and are operated to wind up on a sheave at their pivot-point the brake-chains.

In our invention the mechanism for operating the brake-levers is only needed under one car or the tender, and the continuous rods simply serve to connect the same with the brake-levers.

We are also aware that a shaft winding up on it a chain communicating with a rod carried longitudinally under the car, and carried in a swinging frame, so as to be brought in contact with and rotated by the axle of one pair of the wheels, has been used; but in the present case such mechanism is, in addition, so arranged that it is enabled to operate in either direction.

What we claim is as follows:

1. The combination of the shaft D, made vertically adjustable by screw E and axle A, each provided with friction-surfaces, chain K, lever G, and rods H and H', all constructed and operating substantially in the manner and for the purpose set forth.

2. The combination of the frame C, screw-rod E, working in bushing F, shaft D, with surfaces D', and surfaces A' on axle A, all substantially as described, and for the purposes set forth.

Montreal, 9th day of October, A. D. 1879.

C. FREDK. SINN.
WILLIAM STUDER.

Witnesses:
FRAS. HY. REYNOLDS,
R. ARTHUR KELLOND.